United States Patent
Li et al.

(10) Patent No.: US 7,272,615 B2
(45) Date of Patent: Sep. 18, 2007

(54) META-DATA DRIVEN RESOURCE MANAGEMENT

(75) Inventors: Pengyue Li, Nashua, NH (US); Fernando Salazar, Arlington, MA (US)

(73) Assignee: International Business Machines Corporation, Armonk, NY (US)

( * ) Notice: Subject to any disclaimer, the term of this patent is extended or adjusted under 35 U.S.C. 154(b) by 492 days.

(21) Appl. No.: 10/720,358

(22) Filed: Nov. 24, 2003

(65) Prior Publication Data

US 2005/0114359 A1    May 26, 2005

(51) Int. Cl.
*G06F 17/00* (2006.01)
*G06F 7/00* (2006.01)

(52) U.S. Cl. .................... 707/102; 707/101; 707/3

(58) Field of Classification Search ............... 707/100, 707/101, 102, 3; 715/513; 705/8
See application file for complete search history.

(56) References Cited

U.S. PATENT DOCUMENTS

| | | | | |
|---|---|---|---|---|
| 6,978,422 B1* | 12/2005 | Bushe et al. | ............... | 715/734 |
| 2001/0042139 A1* | 11/2001 | Jeffords et al. | ............. | 709/316 |
| 2003/0018719 A1* | 1/2003 | Ruths et al. | ................ | 709/205 |
| 2003/0145074 A1* | 7/2003 | Penick | ....................... | 709/223 |
| 2003/0217266 A1* | 11/2003 | Epp et al. | .................... | 713/163 |
| 2004/0098294 A1* | 5/2004 | Dean et al. | .................... | 705/8 |
| 2004/0133413 A1* | 7/2004 | Beringer et al. | ............. | 703/22 |

\* cited by examiner

*Primary Examiner*—Kuen S Lu
(74) *Attorney, Agent, or Firm*—Stephen T. Keohane, Esq.; Steven M. Greenberg, Esq.; Carey Rodriguez Greenberg & Paul LLP

(57) ABSTRACT

A metadata driven resource management method can include processing individual metadata documents to identify respective resource names and corresponding resource attributes specified within the individual metadata documents. New resource instances can be created to be managed based upon the respective resource names and the corresponding resource attributes identified within the individual metadata documents. Moreover, the new resource instances can be persisted in a resource non-specific database. Finally, individual ones of the new resource instances can be located and managed based upon the individual metadata documents. Advantageously, individual UI screens for managing selected resource instances can be generated based upon corresponding resource attributes specified within individual metadata documents used to create the selected resource instances.

12 Claims, 3 Drawing Sheets

META-DATA DRIVEN RESOURCE MANAGEMENT

BACKGROUND OF THE INVENTION

1. Statement of the Technical Field

The present invention relates to the field of resource management, and more particularly to resource management in a collaborative computing environment.

2. Description of the Related Art

Collaborative computing includes computing systems configured to facilitate collaboration between end users in regard to a project, document, business process, educational process and the like. Though individual computing applications have permitted collaboration at some level for many decades now, truly collaborative suites have only become commercially popular in the past decade. The most functional of collaborative applications facilitate the completion of a task or set of tasks, whether virtually through a computing system, or actually through in-person collaboration. The conventional learning management system thus represents a common collaborative application.

To facilitate the completion of a task or set of tasks, the typical collaborative application can schedule resources for consumption in the course of completing the task. Additionally, calendared events also can implicate the consumption of resources. In this regard, a resource can include any tangible object prerequisite to the completion of a task or a portion of a task. Generally, resources can range from immutable, permanent and fixed resources such as computing resources, meeting rooms, audiovisual equipment and meeting participants, to consumable resources which require replenishment, such as pencils, paper, ink and toner, to name a few.

In the conventional collaborative application, resource management can be embedded and hard coded to specific elements of the application to manage particular resources utilized in the course of completing a task or a portion of a task. In this regard, resource management refers to the organization, scheduling and tracking of resources which are required by or prerequisite to some collaborative activity facilitated by the collaborative application. For example, where a collaborative activity includes the scheduling and management of a meeting, whether virtual or actual, the resource management logic first must schedule a physical meeting room or computing resources sufficient to host a virtual meeting. Additionally, audiovisual equipment can be requisitioned and, of course, the meeting participants must be scheduled. Considering additional consumable resources such as brochures, presentations, pens and paper, the resource management task can become a daunting task indeed.

Computer systems that manage resources in this way typically do so by specifically implementing system features that are tightly coupled to the types of resources being managed. In the example of a collaborative system configured to arrange meetings, the capabilities to manage the meeting rooms are typically implemented in a "hard coded" fashion that is specific to rooms alone. To add a new resource necessary to complete the meeting task—for instance the reservation and delivery of a projector or white board—the new resource first must defined programmatically within the collaborative system.

Programmatically defining a manageable resource within a collaborative system can be a tolerable task where the manageable resources are simple constructs and few in number. In this regard, to programmatically define the new resource, first a software developer must hard code a description of the new resource within the resource management logic and a specialized database record format must be defined for the new resource. Subsequently the developer must augment the resource management logic to handle the newly added resource, to address individually unique characteristics of the newly added resource and to access the specialized database record format. Thus, as it will be apparent to the skilled artisan, programmatically defining a manageable resource within a collaborative system can become intolerable where the manageable resources become complex in nature and many in number.

It will be recognized by one skilled in the art that resource management is a general computing problem that can be applied to many situations within the collaborative context. In the case of many general computing problems, generic solutions have been implemented to accommodate the particular nuances of specific problem spaces. Still, at present the problem of resource management includes only a selection of solutions each having a specific implementation. Like other computing problems of a general nature, however, there too should be a generic implementation of a solution for managing resources in a collaborative environment. In the generic implementation, one must be able to add resource management capabilities that are specific to a particular problem domain in a convenient and standardized way.

SUMMARY OF THE INVENTION

The present invention addresses the deficiencies of the art in respect to resource management and provides a novel and non-obvious method, system and apparatus for managing resources generically using metadata associated with the managed resources. In accordance with the present invention, a meta-data driven resource management system can include a resource non-specific database having one or more resource records corresponding to multiple different types of resources. A metadata manager can be programmed to define records within the database according to resource name and resource attributes for different resource types specified within metadata definitions of the different resource types.

Finally, a resource manager can be coupled to the metadata manager and the database. The resource manager can include a configuration for creating, locating and reserving resource instances based upon resource types stored in the database and defined within a corresponding metadata definition. Notably, a user interface (UI) generation component can be coupled to the resource manager and configured to generate a UI for the creating, locating and reserving of the resource instances based upon the resource attributes specified within corresponding ones of the metadata definitions of the different resource types.

In a preferred aspect of the present invention, each of the metadata definitions further can specify a resource containment hierarchy. In this way, an access control manager can be coupled to the resource manager and configured to limit access to individual ones of the resource instances based upon a specification of a resource containment hierarchy within a corresponding one of the metadata definitions. In any event, the database, metadata manager and resource manager can be disposed within a collaborative computing application. In particular, the collaborative computing application can include a learning management system programmed to manage learning resources comprising classrooms and instructors.

A metadata driven resource management method can include processing individual metadata documents to identify respective resource names and corresponding resource attributes specified within the individual metadata documents. New resource instances can be created to be managed based upon the respective resource names and the corresponding resource attributes identified within the individual metadata documents. Moreover, the new resource instances can be persisted in a resource non-specific database. Finally, individual ones of the new resource instances can be located and managed based upon the individual metadata documents. Advantageously, individual UI screens for managing selected resource instances can be generated based upon corresponding resource attributes specified within individual metadata documents used to create the selected resource instances.

Significantly, it will be recognized by the skilled artisan that by driving the creation, location and management of resources in the collaborative computing environment through the specification of metadata, costly and ineffective direct modifications to the structure of the database will not be required. In this regard, unlike prior art resource management system configurations, in the present invention, the database can be a resource non-specific database and need not be tailored to accommodate the record format for any particular resource type. Rather, through the knowledge of the resource inferred from the metadata, the entirety of any resource instance can be located and managed within a generically structured, resource non-specific database.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of the this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a system, method and apparatus for metadata driven resource management. In accordance with the present invention, arbitrary and disparate manageable resources can be defined using metadata which describes, at the minimum, a resource name and one or more resource attributes including attribute type. Once defined, the metadata description can be used to create, locate and manage instances of manageable resources within a resource non-specific database. Moreover, the attributes of the resource definition can be used to render a UI through which the resource can be managed. Importantly, access control to the resource can be moderated in accordance with a containment hierarchy expressed within the metadata description.

Figure 1:
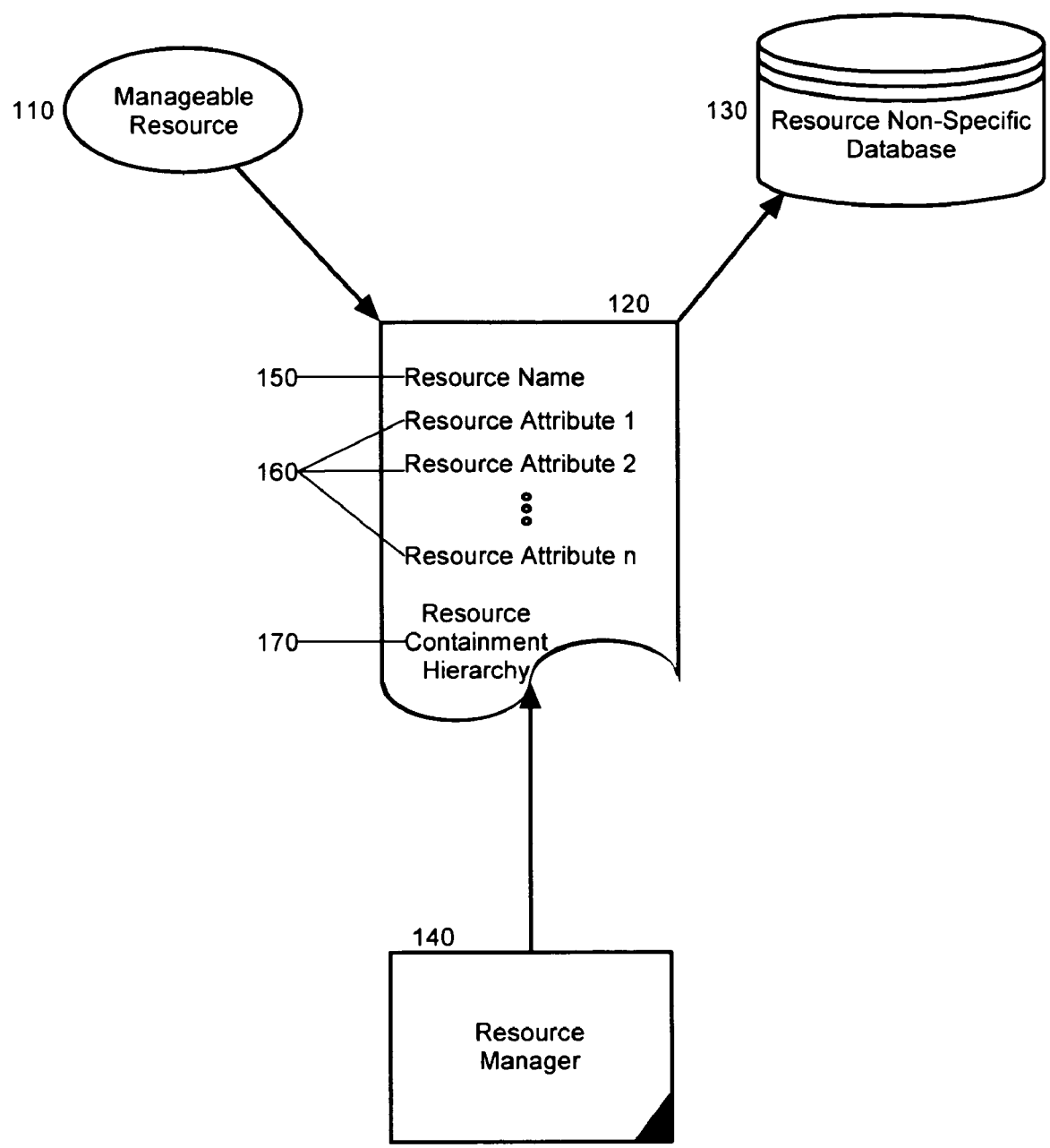
FIG. 1 is a pictorial illustration of a metadata driven resource management system.

In more particular illustration of the core concept of the present invention, FIG. 1 is depicts a metadata driven resource management system having a resource manager 140 configured to process resource metadata 150, 160, 170 in a resource definition 120 to create, locate and manage a corresponding manageable resource 110 in a resource non-specific database 130. The manageable resource 110 can include any resource, whether fixed or consumable, which can be reserved and/or allocated for use in the completion of a task in a collaborative environment. As an example, a classroom, a set of servers configured to process a net meeting, or an instructor can be viewed as a manageable resource in the context of the present invention.

The resource definition 120 can include a resource name 150 and one or more resource attributes 160. Each of the resource attributes 160 can be defined in association with a known or resolvable type. Each of the resource attributes 160 can represent properties of the manageable resource 110. Finally, a containment hierarchy 170 can be defined for the resource definition 120 which can include a specification of name, types and attributes of containment objects used to organize resources into hierarchies. Using the metadata 150, 160, 170 within the resource definition 120, the resource manager 140 can create, locate and manage logical instances of the manageable resource 110 by writing the instance to the database 130.

Importantly, the resource manager 140 can write the instance to the database 130 without creating a new table within the database 130, or without creating a new record format within the database 130. Rather, the generic structure of the database 130 can be used for all instances of all defined resources regardless of the disparity between individual resource types. Rather, the location and meaning of data defining a resource instance can be resolved by reference to respective metadata in a resource definition. While to resolve the location and meaning of data defining a resource instance can be a latency prone process, the disadvantage of unusually long latencies can be overcome by the efficiency and flexibility provided to the end user in defining new resource types in a collaborative environment without requiring programmatic and structural changes to the collaborative environment.

Figure 2:
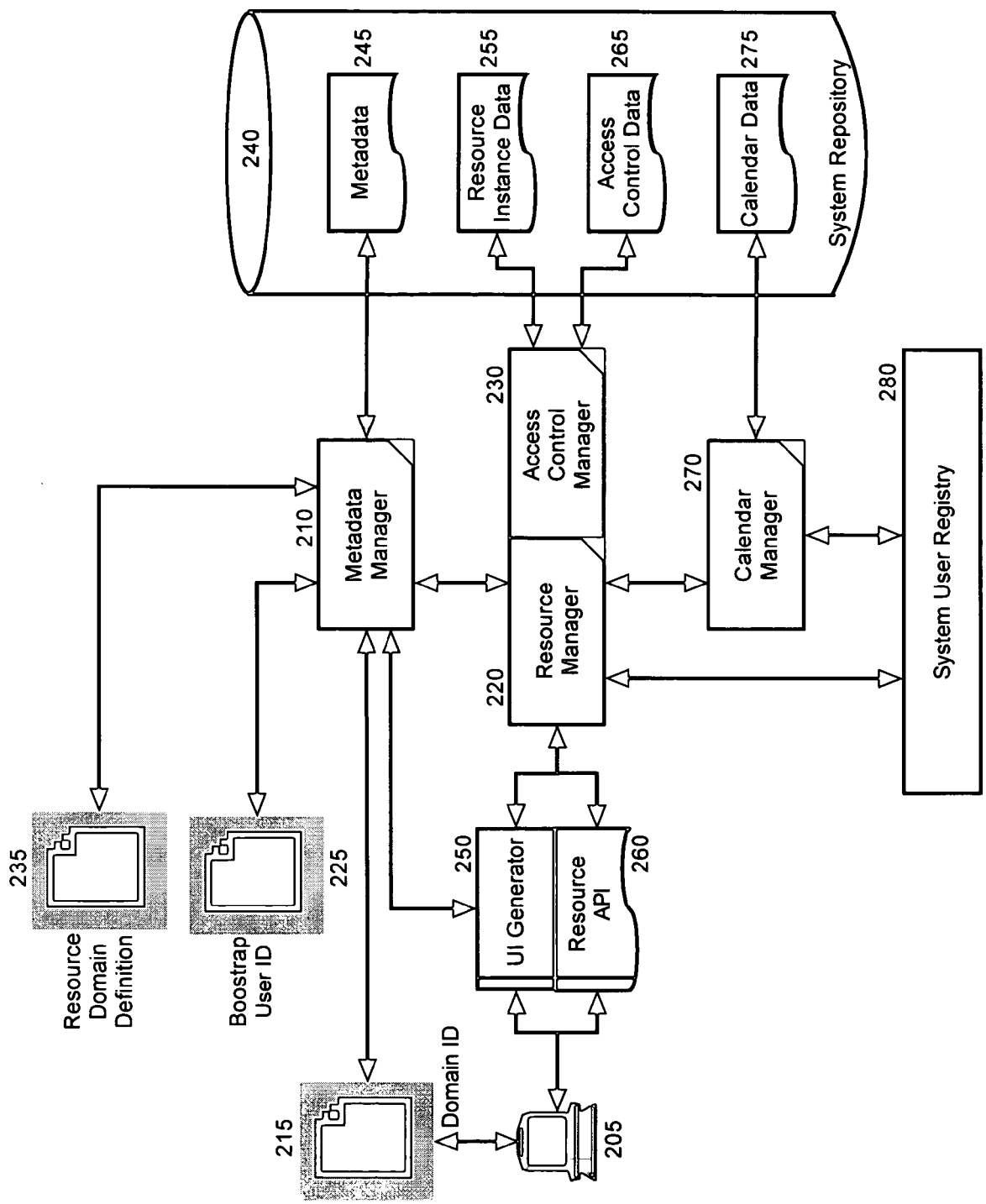
FIG. 2 is a schematic illustration of a metadata driven resource management system disposed within a collaborative computing environment; and, FIG. 3 is a flow chart illustrating a process for metadata driven resource management in the system of FIG. 1.

In more particular illustration of a preferred aspect of the present invention, FIG. 2 is a schematic illustration of a metadata driven resource management system disposed within a collaborative computing environment. The collaborative computing environment can include a resource manager 220 configured to create, locate and manage resource instances in the collaborative environment. In this regard, end users through respective client computing devices 205 (only one device shown for the purpose of simplicity of illustration) can define new resources, create new instances of existing resources, reserve existing instances of resources and release reserved instances of resources.

The resource manager 220 can be closely coupled to an access control manager 230 which can moderate access to resource instance data 255 disposed within a system repository 240. The access control manager 230 can moderate access to the resource instance data 255 based upon access control data 265 also disposed within the system repository 240, and user identity data provided through a system user registry 280 included as part of the collaborative environment. Only to the extent that the business rules of the collaborative environment permit, will the access control manager 220 permit access to the resource instance data 255 through the resource manager 220.

In any case, once access to the resource instance data 255 can be permitted, the resource manager 220 can cooperatively schedule resources for use in performing an activity reflected within calendar data 275 also disposed within the system repository 240. In particular, a calendar manager 270 can control the scheduling of resources by date and time which schedule can be recorded within the calendar data 275. Significantly, an end user through a client-computing device 205 can interact with the resource instance data 255 through an API 360 exposed for programmatic interactions, or through a UI generated for the benefit of the end user by the UI generator 250.

Advantageously, new resources can be defined within the collaborative environment without requiring changes to the programmatic logic and the database structure of the collaborative environment. Rather, a new resource can be defined first through a metadata specification of the resource referred to in FIG. 2 as a resource domain definition 235. In particular, a markup language document conforming to an agreed upon schema can specify a resource name and one or more resource attributes for the new resource.

The metadata manager 210 can validate the name and attributes of the resource domain definition 235 and can store the same along with a user specified bootstrap ID 225 in meta data 245 in the system repository 240. Once the resource domain definition 235 and the bootstrap ID 225 have been successfully processed, the metadata manager 210 can return to the end user a domain ID. The domain ID 215 can be used subsequently to specify the newly defined resource so as to create a new instance of the resource, locate an instance of the resource, or manage the resource.

Figure 3:
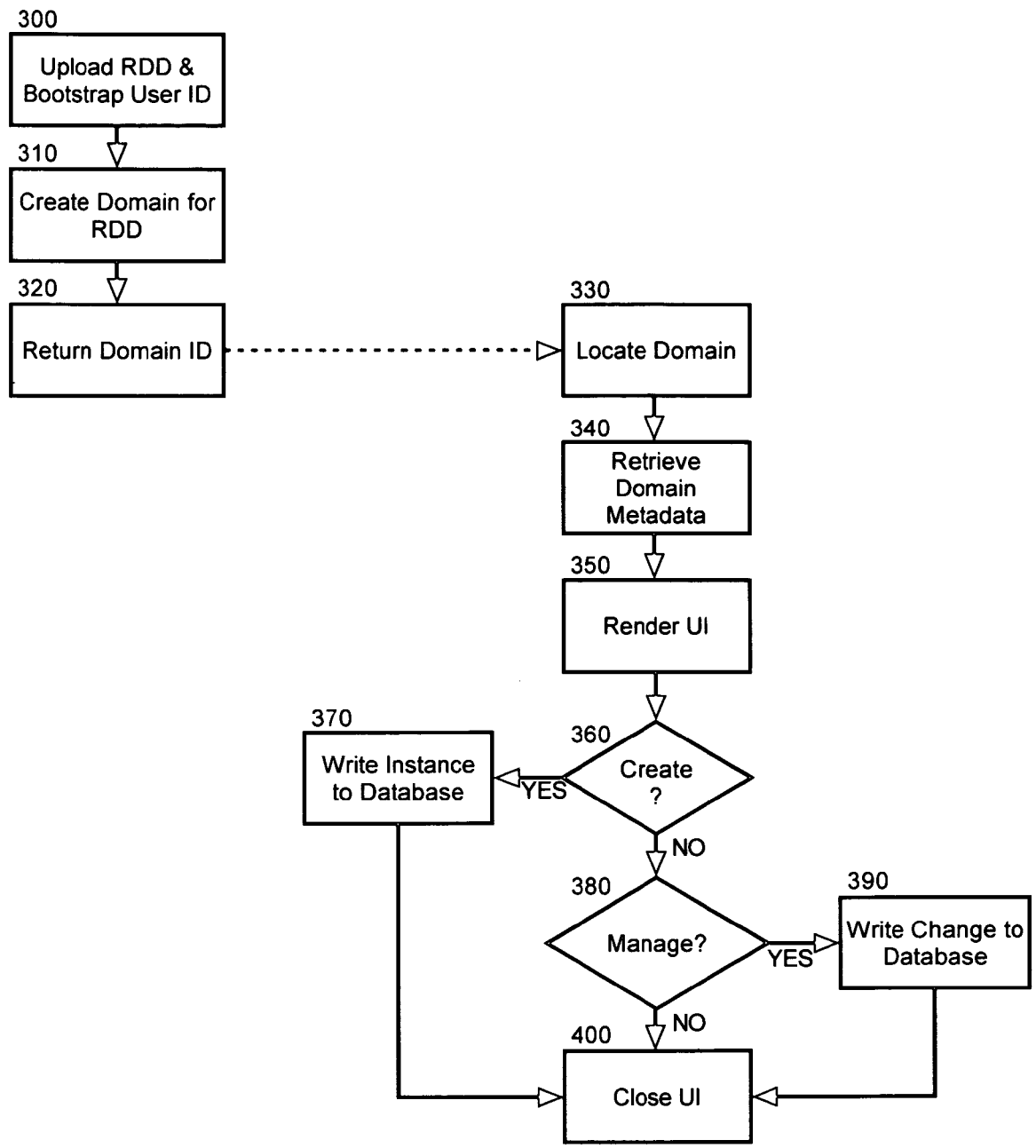

In more particular illustration, FIG. 3 is a flow chart illustrating a process for metadata driven resource management in the system of FIG. 1. Beginning in block 300, the metadata manager can upload a resource domain definition for a newly defined resource and a corresponding bootstrap ID for the user defining the new resource. In block 310, a new resource can be created and persisted for subsequent referral. In particular, based upon the metadata specifying the name and attributes of the newly defined resource, a storage format can be computed for storing instances of the newly defined resource in the database. Once the new resource has been created, in block 320 a handle to the newly created resource can be returned to the end user.

At a later time, the newly defined resource can be managed in furtherance of configuring or performing an activity within the collaborative computing environment. Specifically, first the newly created resource can be located in block 330. The newly created resource either can be located directly by way of the handle to the newly created resource, or through a textual search method exposed by the API. In either case, in block 340 the metadata for the newly created resource can be retrieved. Based upon the attributes specified in the metadata, a dynamic UI such as that which can be specified through dynamic markup, can be rendered through which resource instances can be created and managed.

In this regard, in decision block 360, if it is determined that a new resource instance is to be created for the newly defined resource, in block 370 the new instance can be written to the database and the UI can be closed in block 400. Alternatively, in decision block 380, if it is determined that an existing resource instance is to be managed, for instance reserved, in block 390 the change can be written to the database in respect to the existing resource instance and the UI can be closed in block 400. In either case, it is to be recognized that the foregoing represents merely an exemplary selection of possible operations and the invention is not so limited to merely creating and generically managing resource instances.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A computer managed meta-data driven resource management system for limiting access to resource instances comprising:

a resource non-specific database comprising a plurality of resource records corresponding to multiple different types of fixed or consumable collaborative resources, wherein said fixed or consumable collaborative resources is used in completing a task in a collaborative application;

a metadata manager programmed to perform the step of: defining records within said database according to resource name and resource attributes for different resource types specified within metadata definitions of said different resource types, wherein each of said metadata definitions further specifies a resource hierarchy;

a resource manager coupled to said metadata manager and said database, said resource manager comprising a configuration performing steps comprising of: creating, locating and reserving said resource instances based upon resource types stored in said database and defined within a corresponding metadata definition; and an access control manager coupled to said resource manager and configured to perform the step of:

limiting access to individual ones of said resource instances based upon a specification of said resource containment hierarchy.

2. The system of claim 1, further comprising a user interface (UI) generation component coupled to said resource manager and configured to generate a UI for said creating, locating and reserving of said resource instances based upon said resource attributes specified within corresponding ones of said metadata definitions of said different resource types.

3. The system of claim 1, wherein said database, metadata manager and resource manager are disposed within a collaborative computing application.

4. The system of claim 3, wherein said collaborative computing application comprises a learning management system programmed to manage learning resources comprising classrooms and instructors.

5. A metadata driven resource management method for limiting access to new resource instances comprising the steps of:
identifying respective resource names and corresponding resource attributes of a plurality of fixed or consumable collaborative resources in a plurality of individual metadata documents,
wherein said fixed or consumable collaborative resources is used in completing a task in a collaborative application,
wherein said collaborative application is specified within said individual metadata documents, and
wherein a resource containment hierarchy is specified in said metadata documents;
creating new resource instances,
wherein said new resource instances is managed based upon said respective resource names and said corresponding resource attributes identified within said individual metadata documents;
persisting said new resource instances in a resource non-specific database;
locating and managing individual ones of said new resource instances based upon said individual metadata documents; and
limiting access to said new resource instances based upon said specification of said resource containment hierarchy.

6. The method of claim 5, further comprising the step of generating individual user interface (UI) screens for managing selected resource instances based upon corresponding resource attributes specified within individual metadata documents used to create said selected resource instances.

7. A metadata driven resource management method comprising the step of:
adding a new manageable resource instance of a new manageable resource type for a fixed or consumable collaborative resource,
wherein said fixed or consumable collaborative resources is used in completing a task in a collaborative application to a resource non-specific database,
wherein said resource non-specific database contains a set of manageable resource instances created from corresponding pre-existing manageable resource types which differ from the new resource type, and
wherein the adding step comprising the steps of:
defining the new manageable resource type in a markup language document with a specified resource name and at least one specified resource attribute, the markup language document specifying a resource containment hierarchy;
generating a user interface (UI) for creating and managing the new manageable resource instance based upon said at least one specified resource attribute in said markup language document;
writing the new manageable resource instance to the database; and limiting access to the new manageable resource instance based upon an access control list.

8. The method of claim 7, further comprising the step of locating and managing the new manageable resource instance in the database through said UI.

9. The method of claim 8, wherein said managing step comprises the step of reserving the new manageable resource instance through said UI.

10. The method of claim 7, wherein the defining step comprises the step of defining the new manageable resource type in a markup language document with a specified resource name, at least one specified resource attribute and a containment hierarchy.

11. A machine readable storage medium having stored thereon a computer program for metadata driven resource management, the computer program comprising a routine set of instructions which when executed by the machine cause the machine to perform the steps of:
identifying respective resource names and corresponding resource attributes of a plurality of fixed or consumable collaborative resources in a plurality of individual metadata documents,
wherein said fixed or consumable collaborative resources is used in completing a task in a collaborative application,
wherein said collaborative application is specified within said individual metadata documents, and
wherein a resource containment hierarchy is specified in said metadata documents; creating new resource instances,
wherein said new resource instances is managed based upon said respective resource names and said corresponding resource attributes identified within said individual metadata documents;
persisting said new resource instances in a resource non-specific database;
locating and managing individual ones of said new resource instances based upon said individual metadata documents; and
limiting access to said new resource instances based upon said specification of said resource containment hierarchy.

12. The machine readable storage of claim 11, further comprising the step of generating individual user interface (UI) screens for managing selected resource instances based upon corresponding resource attributes specified within individual metadata documents used to create said selected resource instances.

* * * * *